US012774086B2

(12) United States Patent
Yoshimura et al.

(10) Patent No.: US 12,774,086 B2
(45) Date of Patent: Oct. 27, 2026

(54) CONTROL DEVICE, CONTROL METHOD, AND FLYING OBJECT

(71) Applicant: HONDA MOTOR CO., LTD., Tokyo (JP)

(72) Inventors: Kaisaku Yoshimura, Wako (JP); Toshinori Tsukamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 12 days.

(21) Appl. No.: 19/087,899

(22) Filed: Mar. 24, 2025

(65) Prior Publication Data

US 2025/0296680 A1 Sep. 25, 2025

(30) Foreign Application Priority Data

Mar. 25, 2024 (JP) ................................ 2024-047981

(51) Int. Cl.
*B64C 27/57* (2006.01)

(52) U.S. Cl.
CPC .................................. *B64C 27/57* (2013.01)

(58) Field of Classification Search
None
See application file for complete search history.

(56) References Cited

U.S. PATENT DOCUMENTS 11,840,329 B1 * 12/2023 Hinman .................... B64C 1/26
2020/0073410 A1 * 3/2020 Tillotson ............... B64C 27/006

FOREIGN PATENT DOCUMENTS

JP 2022-70146 A 5/2022

* cited by examiner

*Primary Examiner* — Lail A Kleinman
(74) *Attorney, Agent, or Firm* — Rankin, Hill & Clark LLP

(57) ABSTRACT

A control device for controlling an electric motor that rotates a rotor, the control device including: a determination unit configured to determine control to be performed based on a rotational speed of the rotor, the control being either rotational speed control for controlling the electric motor so as to rotate the rotor at a target value of the rotational speed of the rotor or constant torque control for controlling the electric motor at a constant torque regardless of the rotational speed of the rotor; and a control unit configured to perform one of the rotational speed control or the constant torque control in accordance with a determination result of the determination unit.

10 Claims, 6 Drawing Sheets

10

CONTROL DEVICE, CONTROL METHOD, AND FLYING OBJECT

CROSS-REFERENCE TO RELATED APPLICATIONS

This application is based upon and claims the benefit of priority from Japanese Patent Application No. 2024-047981 filed on Mar. 25, 2024, the contents of which are incorporated herein by reference.

BACKGROUND OF THE INVENTION

Field of the Invention

The present disclosure relates to a control device, a control method, and a flying object.

Description of the Related Art

In recent years, research and development have been conducted on electrification technology that contributes to energy efficiency in order to ensure that more people have access to affordable, reliable, sustainable and modern energy.

JP 2022-070146 A discloses an electric rotary wing aircraft which flies with rotors rotated by electric motors. A control device of this aircraft performs feedback control so that the electric motors rotate at the set rotational speeds.

SUMMARY OF THE INVENTION

It is desirable to appropriately control a rotor.

The present invention has the object of solving the aforementioned problem.

A first aspect of the present disclosure is to provide a control device for controlling an electric motor that rotates a rotor, the control device including: a determination unit configured to determine control to be performed based on a rotational speed of the rotor, the control being either rotational speed control for controlling the electric motor so as to rotate the rotor at a target value of the rotational speed of the rotor or constant torque control for controlling the electric motor at a constant torque regardless of the rotational speed of the rotor; and a control unit configured to perform one of the rotational speed control or the constant torque control in accordance with a determination result of the determination unit.

A second aspect of the present disclosure is to provide a flying object including the control device according to the first aspect.

A third aspect of the present disclosure is to provide a control method for controlling an electric motor that rotates a rotor, the control method including: a determination step of determining control to be performed based on a rotational speed of the rotor, the control being either rotational speed control for the electric motor so as to rotate the rotor at a target value of the rotational speed of the rotor or constant torque control for controlling the electric motor at a constant torque regardless of the rotational speed of the rotor; and a control step of performing one of the rotational speed control or the constant torque control in accordance with a determination result of the determination unit.

According to the present invention, the rotor can be controlled appropriately.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

For example, as control of a rotor of an electric vertical take-off and landing (eVTOL) aircraft, rotational speed control and constant torque control can be performed. Each of the rotational speed control and the constant torque control has advantages and disadvantages. For example, a rotational speed range of the VTOL rotor includes a range in which the rotational speed control is preferable and a range in which constant torque control is preferable. The control device described in the present specification appropriately switches between the rotational speed control and the constant torque control on the basis of the rotational speed of the VTOL rotor. The embodiment will be described below.

1. Flying Object 10

Figure 1:
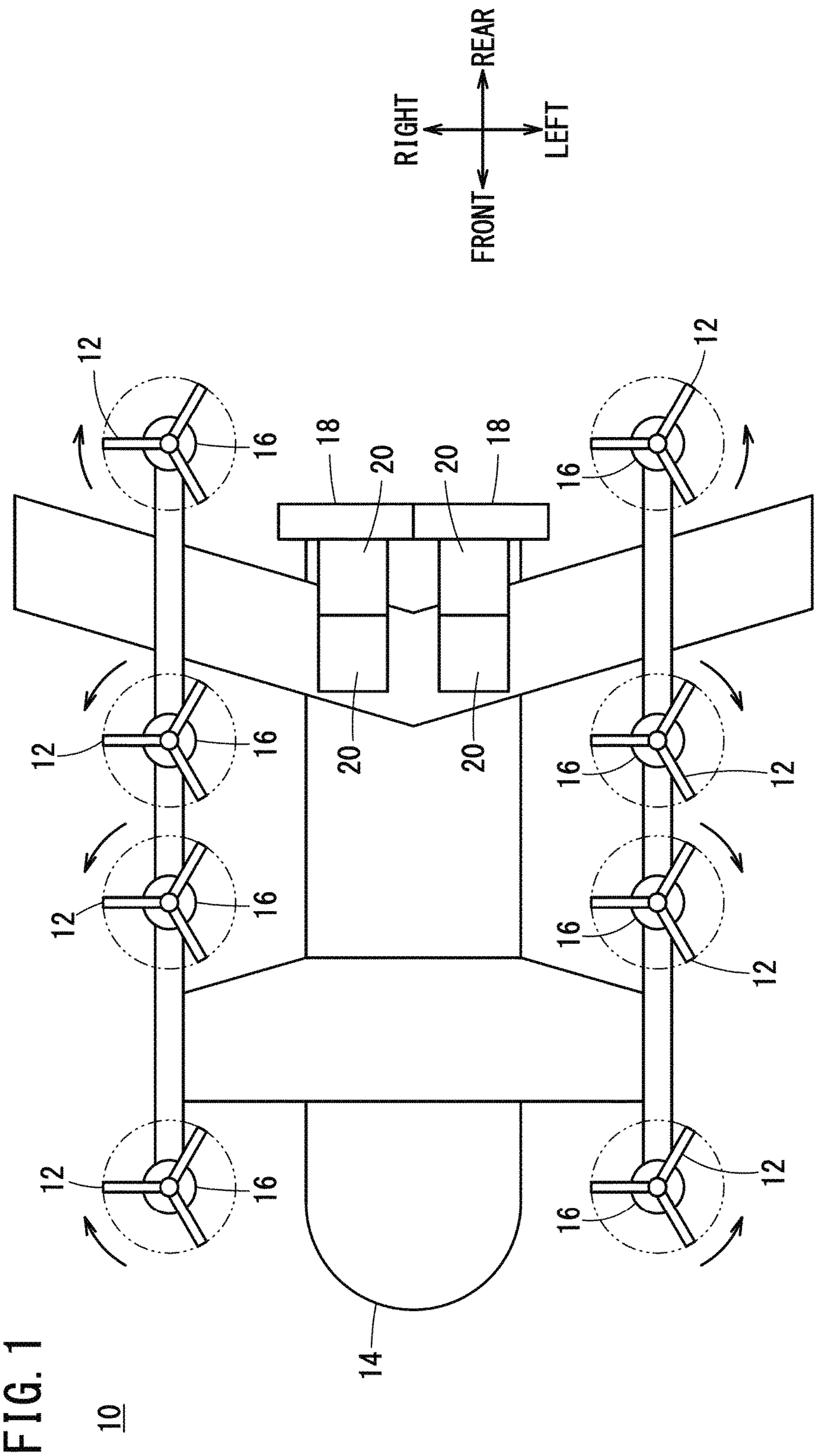
FIG. 1 is a schematic view of a flying object.

FIG. 1 is a schematic view of a flying object 10. The flying object 10 is an electric vertical take-off and landing (eVTOL) aircraft. The flying object 10 is equipped with eight VTOL rotors 12. The VTOL rotors 12 generate an upwardly directed thrust with respect to an airframe 14. For the eight VTOL rotors 12, the flying object 10 is equipped with eight electric motors 16. One of the electric motors 16 drives one of the VTOL rotors 12. The flying object 10 includes two cruise rotors 18. The cruise rotors 18 generate a forwardly directed thrust with respect to the airframe 14. For the two cruise rotors 18, the flying object 10 is equipped with four electric motors 20. Two of the electric motors 20 drive one of the cruise rotors 18.

2. Motor Drive System 22

Figure 2:
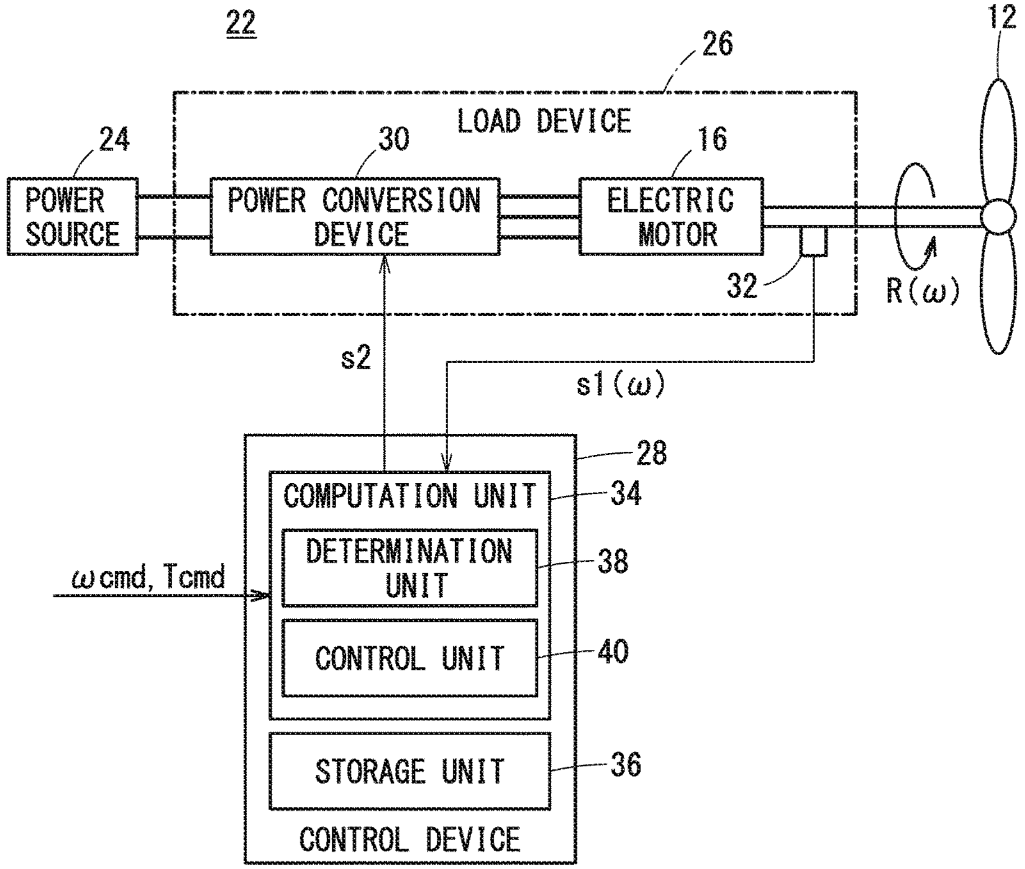
FIG. 2 is a block diagram of a motor drive system.

FIG. 2 is a block diagram of a motor drive system 22. The motor drive system 22 is mounted in the flying object 10 shown in FIG. 1. The motor drive system 22 includes a power source 24, a load device 26, and a control device 28. The load device 26 includes a power conversion device 30 and the electric motors 16. Although FIG. 2 shows an embodiment in which one load device 26 is connected to one power source 24, a plurality of load devices 26 may be connected to one power source 24. Further, one load device 26 may be connected to a plurality of power sources 24. Further, a plurality of load devices 26 may be connected to a plurality of power sources 24.

The power source 24 includes, for example, at least one of a generator and a capacitor (both not shown). The power source 24 supplies direct-current power to the power conversion device 30 of the load device 26. The power conversion device 30 includes, for example, an inverter. The power conversion device 30 converts the direct-current power supplied from the power source 24 into three-phase alternating-current power and supplies the three-phase alternating-current power to the electric motor 16. The electric motor 16 is driven by electrical power supplied from the power source 24 via the power conversion device 30.

The motor drive system 22 includes a sensor that detects a physical quantity correlated with the rotational speed of the VTOL rotor 12 (referred to as a rotor rotational speed R). For example, the motor drive system 22 includes an angular velocity sensor 32. For example, the angular velocity sensor 32 may be configured by a rotary encoder, a resolver, or the like. The angular velocity sensor 32 outputs a signal s1 indicating a rotor angular velocity ω to a computation unit 34 of the control device 28. In the present embodiment, the angular velocity of the VTOL rotor 12 (referred to as a rotor angular velocity ω) detected by the angular velocity sensor 32 is converted into a rotor rotational speed R in the control device 28.

The control device 28 includes the computation unit 34 and a storage unit 36. The control device 28 is configured, for example, as an ECU (Electronic Control Unit).

The computation unit 34 can be constituted by a processor such as a CPU (Central Processing Unit), a GPU (Graphics Processing Unit), or the like. More specifically, the computation unit 34 can be configured by a processing circuit (processing circuitry). At least a portion of the computation unit 34 may be realized by an integrated circuit such as an ASIC (Application Specific Integrated Circuit) or an FPGA (Field-Programmable Gate Array) or the like. At least a portion of the computation unit 34 may be realized by an electronic circuit including a discrete device.

The computation unit 34 includes a determination unit 38 and a control unit 40. On the basis of the rotational speed of the VTOL rotor 12, the determination unit 38 determines which of rotational speed control (FIG. 3) and constant torque control (FIG. 4) is to be executed. The process performed by the determination unit 38 (referred to as a control determination process) will be described later. The control unit 40 performs either one of the rotational speed control and the constant torque control, in accordance with the determination result of the determination unit 38. The control unit 40 outputs a switching signal s2 to each switching element (not shown) included in the power conversion device 30 in each of the rotational speed control and the constant torque control. Thus, the control unit 40 performs switching control of each switching element included in the power conversion device 30.

The computation unit 34 acquires an angular velocity command value ωcmd and a torque command value Tcmd from a superordinate controller such as a flight controller (not shown). The angular velocity command value ωcmd is a command value of the rotor angular velocity ω, and corresponds to a command value of the rotational speed of the electric motor 16. The torque command value Tcmd is a command value of the torque T generated by the electric motor 16. The command value of each physical quantity is a target value of each physical quantity.

The storage unit 36 is a computer-readable storage medium. The storage unit 36 is formed of a non-illustrated volatile memory and a non-illustrated nonvolatile memory. The volatile memory, for example, is a RAM (Random Access Memory) or the like. As the non-volatile memory, there may be cited, for example, a ROM (Read Only Memory), a flash memory, or the like. Data and the like are stored, for example, in the volatile memory. Programs, tables, maps, and the like are stored, for example, in the nonvolatile memory. At least a portion of the storage unit 36 may be provided in the above-described processor, the integrated circuit, or the like.

3. Rotational Speed Control and Constant Torque Control

Figure 3:
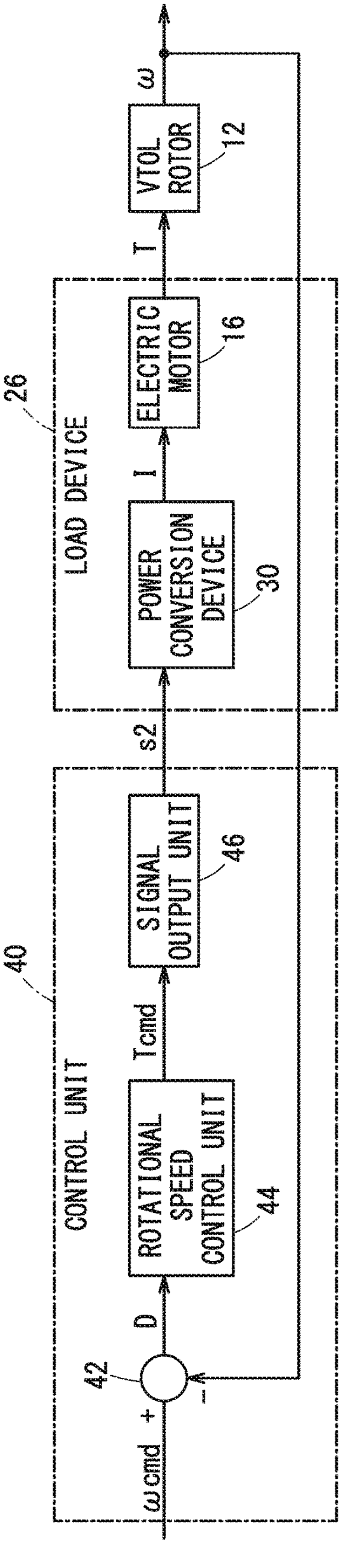
FIG. 3 is a block diagram showing a flow of signal transmission in rotational speed control.

FIG. 3 is a block diagram showing a flow of signal transmission in the rotational speed control. In the rotational speed control, the electric motor 16 is controlled to bring the rotor rotational speed R close to a target value. The rotational speed control is closed loop control (feedback control). When the determination unit 38 determines to execute the rotational speed control, the control unit 40 executes the rotational speed control shown in FIG. 3. In this case, the control unit 40 functions as a subtraction unit 42, a rotational speed control unit 44, and a signal output unit 46.

The subtraction unit 42 subtracts the rotor angular velocity ω detected by the angular velocity sensor 32 from the angular velocity command value ωcmd acquired from the superordinate controller to obtain a deviation D (ωcmd−ω).

The rotational speed control unit 44 generates a torque command value Tcmd for controlling the electric motor 16 based on the deviation D calculated by the subtraction unit 42. Here, the rotational speed control unit 44 generates a torque command value Tcmd required for bringing the rotor angular velocity ω (i.e., the rotor rotational speed R) close to the angular velocity command value ωcmd (i.e., the target value of the rotor rotational speed R). For example, the rotational speed control unit 44 calculates the torque command value Tcmd by the following equation. In the following equation, "s" is a differential operator. Further, the gains (Kp, Ki, Kd) in the following equation are stored beforehand in the storage unit 36.

$$Tcmd = \left(Kp + \frac{Ki}{s} + Kds\right)D$$

Kp: velocity control proportional gain
Ki: velocity control integral gain
Kd: velocity control differential gain The signal output unit 46 outputs a switching signal s2 for switching on and off each switching element of the power conversion device 30 on the basis of the torque command value Tcmd calculated by the rotational speed control unit 44.

Each switching element of the power conversion device 30 is switched from an ON state to an OFF state or from an OFF state to an ON state in accordance with the switching signal s2 outputted from the signal output unit 46. The power conversion device 30 converts a direct current supplied from the power source 24 into an alternating current I and supplies the alternating current I to the electric motor 16.

When the alternating current I is supplied from the power conversion device 30 to the electric motor 16, the electric motor 16 is rotationally driven. The electric motor 16 rotates the VTOL rotor 12 while generating a torque T corresponding to the alternating current I.

Figure 4:
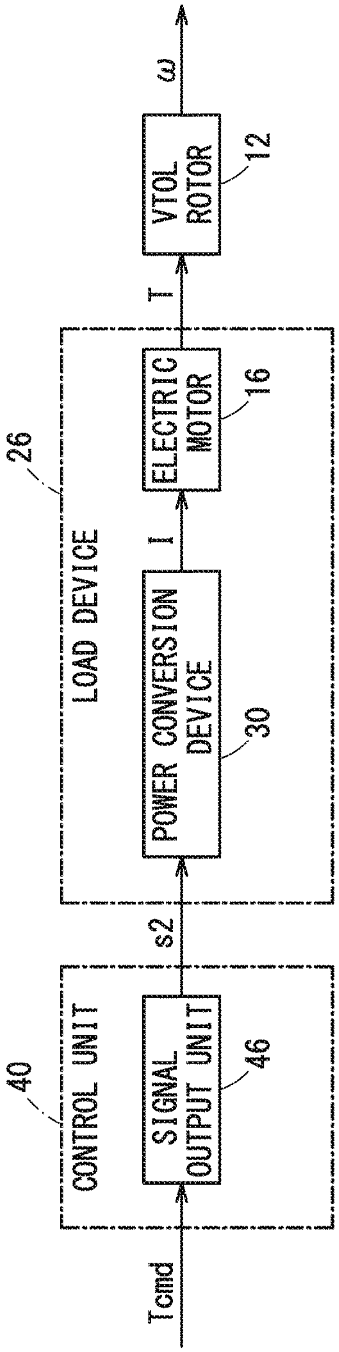
FIG. 4 is a block diagram showing a flow of signal transmission in constant torque control.

FIG. 4 is a block diagram showing a flow of signal transmission in the constant torque control. In the constant torque control, the electric motor 16 is controlled to generate a constant torque T. The constant torque control is open loop control performed regardless of the rotor rotational speed R (rotor angular velocity ω). In the case where the determination unit 38 determines to execute the constant torque control, the control unit 40 executes the constant torque control shown in FIG. 4. In this case, the control unit 40 functions as the signal output unit 46.

The signal output unit 46 outputs a switching signal s2 for switching on and off the switching elements of the power conversion device 30 on the basis of the torque command value Tcmd acquired from the superordinate controller. The power conversion device 30 and the electric motor 16 operate in the same manner as in the rotational speed control.

4. Resonant Rotational Speed Range

Figure 5:
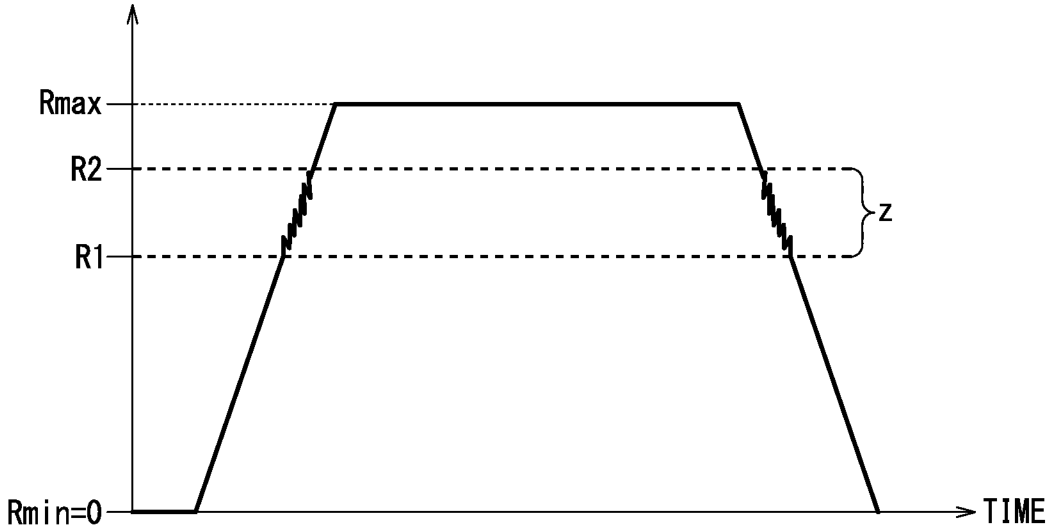
FIG. 5 is a diagram showing a rotational speed of a VTOL rotor in time series.

FIG. 5 is a diagram showing a rotational speed of the VTOL rotor 12 in time series. A range between a lower limit value Rmin (=0) and an upper limit value Rmax of the rotational speed at which the VTOL rotor 12 can rotate is referred to as a rotational speed range. A resonance speed range z is included in the range. In the case where the VTOL rotor 12 rotates at a rotational speed within the resonant rotational speed range z, the components of the VTOL rotor 12 resonate. In the case where the components of the VTOL rotor 12 resonate, the VTOL rotor 12 vibrates violently. As a result, the angular velocity sensor 32 also vibrates violently. Then, the signal s1 outputted from the vibrating angular velocity sensor 32 includes noise. In this case, if the control unit 40 performs rotational speed control using the rotor angular velocity ω indicated by the signal s1 as an input value, the calculated values (for example, the torque command value Tcmd) may diverge, and the control may become impossible.

Normally, the airframe 14 can be controlled with higher accuracy by the rotational speed control, which is a feedback control, than by the constant torque control, which is not a feedback control. However, in the case where the rotor rotational speed R falls within the resonant rotational speed range z, the constant torque control, which is not the feedback control, can provide more stable control than the rotational speed control, which is a feedback control. Therefore, in the present embodiment, the control unit 40 performs the rotational speed control in the case where the rotor rotational speed R falls outside the resonant rotational speed range z, and performs the constant torque control in the case where the rotor rotational speed R falls within the resonant rotational speed range z.

5. Control Determination Process

Figure 6:
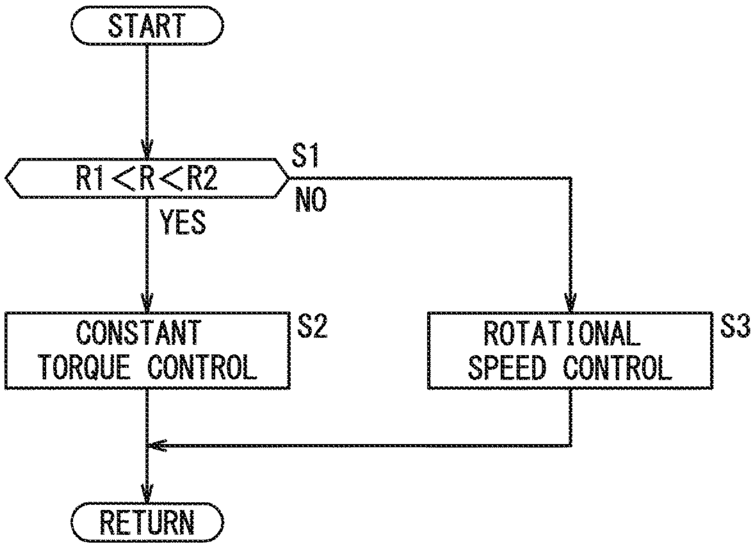
FIG. 6 is a flowchart of a control determination process performed by a determination unit.

FIG. 6 is a flowchart of a control determination process performed by the determination unit 38. The process illustrated in FIG. 6 is executed at predetermined time intervals during flight of the flying object 10. In the case of acquiring the signal s1 from the angular velocity sensor 32, the determination unit 38 converts the rotor angular velocity ω indicated by the signal s1 into the rotor rotational speed R.

The storage unit 36 stores beforehand a lower threshold R1 and an upper threshold R2 of the resonant rotational speed range z. The lower threshold R1 and the upper threshold R2 are set based on the results of simulation, actual measurement, and the like. The lower threshold R1 may be zero. In this case, a range from a height position of zero altitude (ground) to a height position corresponding to the upper threshold R2 is set as the resonant rotational speed range z.

In step S1, the determination unit 38 determines whether or not the rotor rotational speed R falls within the resonant rotational speed range z. For example, the determination unit 38 compares the rotor rotational speed R with the lower threshold R1 and the upper threshold R2 of the resonant rotational speed range z. If the rotor rotational speed R falls within the resonant rotational speed range z, that is, if R1<R<R2 holds true (step S1: YES), the process proceeds to step S2. On the other hand, in the case where the rotor rotational speed R falls outside the resonant rotational speed range z, that is, when R≤R1 or R2≤R (step S1: NO), the process proceeds to step S3.

In the case where the process proceeds from step S1 to step S2, the determination unit 38 determines that the constant torque control is to be executed. The control unit 40 executes the constant torque control shown in FIG. 4 in accordance with the determination result of the determination unit 38.

In the case where the process proceeds from step S1 to step S3, the determination unit 38 determines that the rotational speed control is to be executed. The control unit 40 executes the rotational speed control shown in FIG. 3 in accordance with the determination result of the determination unit 38.

The process illustrated in FIG. 6 may be performed in a specific situation. For example, the computation unit 34 may perform the process illustrated in FIG. 6 in the case where the flying object 10 transitions from a state of horizontal movement to a state of landing. Specifically, the computation unit 34 may perform the process illustrated in FIG. 6 in response to a command of a stop request of the VTOL rotors 12 from the superordinate controller. In the case where the superordinate controller outputs the command of the stop request, the target value of the rotor angular velocity ω is zero (angular velocity command value ωcmd=0), and the target value of the rotor rotational speed R is zero.

The flying object 10 increases the rotor rotational speed R at takeoff and decreases it afterwards. The flying object 10 increases the rotor rotational speed R also at landing and decreases it afterwards.

In the process of increasing the rotor rotational speed R, the rotor rotational speed R is increased from a low rotational speed falling in a low rotational speed range lower than the resonant rotational speed range z to a resonant rotational speed falling within the resonant rotational speed range z. The determination unit 38 determines to execute the constant torque control in the case where the rotor rotational speed R is increased from the low rotational speed falling within the low rotational speed range to the resonant rotational speed falling within the resonant rotational speed range z. Thereafter, the rotor rotational speed R further is increased from the resonant rotational speed falling within the resonant rotational speed range z to a high rotational speed falling within a high rotational speed range higher than the resonant rotational speed range z. The determination unit 38 determines to execute the rotational speed control in the case where the rotor rotational speed R is increased from the resonant rotational speed falling within the resonant rotational speed range z to the high rotational speed falling within the high rotational speed range.

In the process of decreasing the rotor rotational speed R, the rotor rotational speed R is decreased from a high rotational speed falling within the high rotational speed range higher than the resonant rotational speed range z to a resonant rotational speed falling within the resonant rotational speed range z. The determination unit 38 determines to execute the constant torque control in the case where the rotor rotational speed R is decreased from the high rotational speed falling within the high rotational speed range to the resonant rotational speed falling within the resonant rotational speed range z. Thereafter, the rotor rotational speed R is further decreased from the resonant rotational speed falling within the resonant rotational speed range z to a low rotational speed falling within the low rotational speed range lower than the resonant rotational speed range z. The determination unit 38 determines to execute the rotational speed control in the case where the rotor rotational speed R is decreased from the resonant rotational speed falling within the resonant rotational speed range z to the low rotational speed falling within the low rotational speed range.

6. Effects

According to the present embodiment, the rotational speed control and the constant torque control can be switched at an appropriate timing, and the VTOL rotors 12 can be appropriately controlled.

In the present embodiment, the constant torque control is performed in the case where the rotor rotational speed R of the VTOL rotors 12 falls within the resonant rotational speed range z. Therefore, according to the present embodiment, even in the case where the rotor rotational speed R of the VTOL rotors 12 falls within the resonant rotational speed range z, divergence in values calculated by the control unit 40 can be suppressed, and stable control can be performed. Further, according to the present embodiment, the rotational speed control is performed in the case where the rotor rotational speed R of the VTOL rotor 12 falls outside the resonant rotational speed range z. Therefore, according to the present embodiment, in the case where the rotor rotational speed R of the VTOL rotors 12 falls outside the resonant rotational speed range z, highly accurate control can be performed.

7. Supplementary Note

In relation to the above-described disclosure, the following supplementary notes are further disclosed.

Supplementary Note 1

The control device (28) according to the present disclosure for controlling the electric motor (16) that rotates the rotor (12), the control device including: the determination unit (38) configured to determine control to be performed based on a rotational speed of the rotor, the control being either rotational speed control for controlling the electric motor so as to rotate the rotor at a target value of the rotational speed of the rotor or constant torque control for controlling the electric motor at a constant torque regardless of the rotational speed of the rotor; and the control unit (40) configured to perform one of the rotational speed control or the constant torque control in accordance with a determination result of the determination unit.

According to the above-mentioned configuration, the rotational speed control and the constant torque control can be switched at an appropriate timing, and the rotors can be appropriately controlled.

Supplementary Note 2

In the control device according to Supplementary Note 1, the determination unit may determine to perform the constant torque control in a case where the rotational speed of the rotor falls within the resonant rotational speed range (z) where resonance occurs in the rotor, and may determine to perform the rotational speed control in the case where the rotor rotational speed falls outside the resonant rotational speed range.

In the above configuration, the constant torque control is performed in the case where the rotational speed of the rotor falls within the resonant rotational speed range. According to the above configuration, even in a case where the rotational speed of the rotor falls within the resonant rotational speed range, it is possible to suppress divergence in values calculated by the control unit, and to perform stable control. Further, according to the above configuration, the rotational speed control is performed in the case where the rotational speed of the rotor falls outside the resonant rotational speed range. Therefore, according to the above configuration, in the case where the rotational speed of the rotor falls outside the resonant rotational speed range, highly accurate control can be performed.

Supplementary Note 3

In the control device according to Supplementary Note 2, the control unit may switch from the rotational speed control to the constant torque control in the case where the rotational speed of the rotor is decreased from a rotational speed value higher than the upper threshold (R2) of the resonant rotational speed range to a rotational speed value within the resonant rotational speed range.

According to the above configuration, in the case where the rotational speed of the rotor is decreased, stable control can be performed by the constant torque control.

Supplementary Note 4

In the control device according to the additional statement 3, the control unit may switch from the constant torque control to the rotational speed control in the case where the rotational speed of the rotor is decreased from a rotational speed value within the resonant rotational speed range to a rotational speed value lower than the lower threshold (R1) of the resonant rotational speed range.

According to the above configuration, in the case where the rotational speed of the rotor is decreased, it is possible to perform control with high accuracy by the rotational speed control.

Supplementary Note 5

In the control device according to Supplementary Note 1, the target value may be zero.

Supplementary Note 6

In the control device according to Supplementary Note 2, the control unit may switch from the rotational speed control to the constant torque control in the case where the rotational speed or the rotor is increased from a rotational speed value lower than a lower threshold of the resonant rotational speed range to a rotational speed value within the resonant rotational speed range.

According to the above configuration, in the case where the rotational speed of the rotor is increased, stable control can be performed by the constant torque control.

Supplementary Note 7

In the control device according to Supplementary Note 6, the control unit may switch from the constant torque control to the rotational speed control in the case where the rotational speed of the rotor is increased from a rotational speed within the resonant rotational speed range to a rotational speed value higher than an upper threshold of the resonant rotational speed range.

According to the above configuration, in the case where the rotational speed of the rotor is increased, it is possible to perform control with high accuracy by the rotational speed control.

Supplementary Note 8

In the control device according to Supplementary Note 1, the target value may be higher than the upper threshold of the resonant rotational speed range in which resonance occurs in the rotor.

Supplementary Note 9

A flying object (10) includes the control device according to any one of Supplementary Notes 1 to 8.

Supplementary Note 10

The control method according to the present disclosure for controlling the electric motor that rotates the rotor, the control method including: the determination step (step S1) of determining control to be performed based on a rotational speed of the rotor, the control being either rotational speed control for controlling the electric motor so as to rotate the rotor at a target value of the rotational speed of the rotor or constant torque control for controlling the electric motor at the constant torque regardless of the rotational speed of the rotor; and the control step (step S2, step S3) of performing one of the rotational speed control or the constant torque control in accordance with a determination result of the determination unit.

According to the above-mentioned configuration, the rotational speed control and the constant torque control can be switched at an appropriate timing, and the rotors can be appropriately controlled.

Although concerning the present disclosure, a detailed description thereof has been presented above, the present disclosure is not necessarily limited to the individual embodiments described above. These embodiments may be subjected to various additions, substitutions, modifications, partial deletions and the like, within a range that does not deviate from the essence and gist of the present disclosure, or the spirit of the present disclosure as derived from the contents described in the claims and equivalents thereof. Further, the embodiments can also be implemented together in combination. For example, in the above-described embodiments, the order of each of the operations and the order of each of the processes are illustrated as examples, and the present invention is not necessarily limited to these features. The same also applies to cases in which numerical values or mathematical expressions are used in the description of the aforementioned embodiments.

The invention claimed is:

1. A control device for controlling an electric motor that rotates a rotor, the control device comprising one or more processors that execute computer-executable instructions stored in a memory, wherein the one or more processors execute the computer-executable instructions to cause the control device to:

determine control to be performed based on a rotational speed of the rotor, the control being either rotational speed control for controlling the electric motor so as to rotate the rotor at a target value of the rotational speed of the rotor or constant torque control for controlling the electric motor at a constant torque regardless of the rotational speed of the rotor; and perform one of the rotational speed control or the constant torque control in accordance with a determination result.

2. The control device according to claim 1, wherein the one or more processors cause the control device to:

determine to perform the constant torque control in a case where the rotational speed of the rotor falls within a resonant rotational speed range where resonance occurs in the rotor, and determine to perform the rotational speed control in a case where the rotational speed of the rotor falls outside the resonant rotational speed range.

3. The control device according to claim 2, wherein the one or more processors cause the control device to:

switch from the rotational speed control to the constant torque control in a case where the rotational speed of the rotor is decreased from a rotational speed value higher than an upper threshold of the resonant rotational speed range to a rotational speed value within the resonant rotational speed range.

4. The control device according to claim 3, wherein the one or more processors cause the control device to:

switch from the constant torque control to the rotational speed control in a case where the rotational speed of the rotor is decreased from a rotational speed value within the resonant rotational speed range to a rotational speed value lower than a lower threshold of the resonant rotational speed range.

5. The control device according to claim 1, wherein the target value is zero.

6. The control device according to claim 2, wherein the one or more processors cause the control device to:

switch from the rotational speed control to the constant torque control in a case where the rotational speed of the rotor is increased from a rotational speed value lower than a lower threshold of the resonant rotational speed range to a rotational speed value within the resonant rotational speed range.

7. The control device according to claim 6, wherein the one or more processors cause the control device to:

switch from the constant torque control to the rotational speed control in a case where the rotational speed of the rotor is increased from a rotational speed value within the resonant rotational speed range to a rotational speed value higher than an upper threshold of the resonant rotational speed range.

8. The control device according to claim 1, wherein the target value is higher than an upper threshold of a resonant rotational speed range in which resonance occurs in the rotor.

9. A flying object comprising the control device according to claim 1.

10. A control method for controlling an electric motor that rotates a rotor, the control method comprising:

determining control to be performed based on a rotational speed of the rotor detected by a sensor, the control being either rotational speed control for controlling the electric motor so as to rotate the rotor at a target value of the rotational speed of the rotor or constant torque control for controlling the electric motor at a constant torque regardless of the rotational speed of the rotor; and performing one of the rotational speed control or the constant torque control in accordance with a determination result in the determining.

* * * * *